May 18, 1965 A. E. PLEGAT 3,184,263
MOTOR VEHICLE DOOR PANEL STRUCTURE
Filed April 1, 1963 2 Sheets-Sheet 1
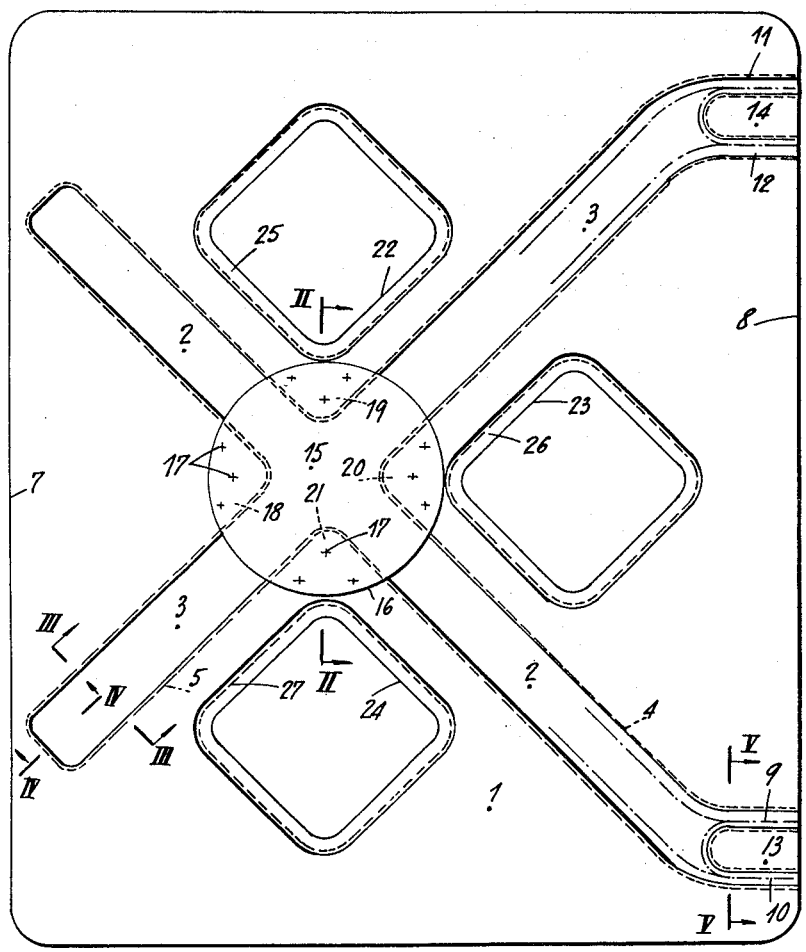
Inventor
Alain Edouard Plegat
By Alvin Browdy
attorney May 18, 1965    A. E. PLEGAT    3,184,263
MOTOR VEHICLE DOOR PANEL STRUCTURE
Filed April 1, 1963    2 Sheets-Sheet 2
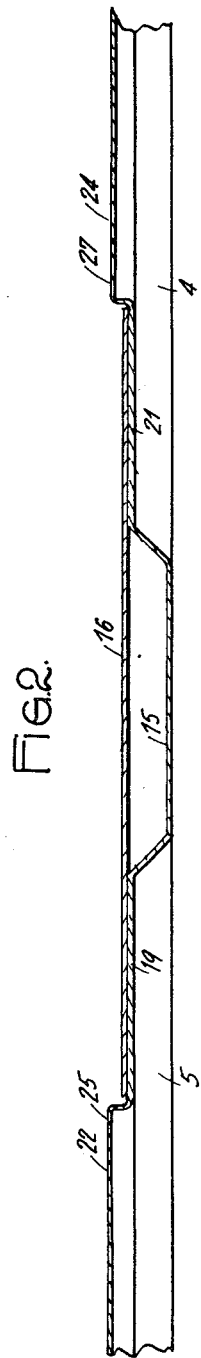
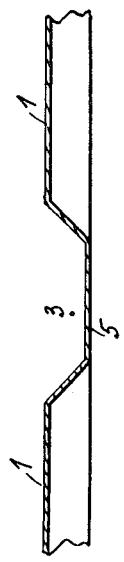
Inventor
Alain Edouard Plegat
By Alvin Browdy
Attorney United States Patent Office 3,184,263
Patented May 18, 1965

3,184,263
MOTOR VEHICLE DOOR PANEL STRUCTURE
Alain Edouard Plegat, Asnieres, France, assignor to Societe Anonyme des Usines Chausson, Asnieres, France, a company of France
Filed Apr. 1, 1963, Ser. No. 269,239
Claims priority, application France, Apr. 25, 1962, 895,590, Patent 1,329,016
4 Claims. (Cl. 296—44)

Certain elements of motor car bodies made in panels are formed by a steel sheet shaped and a flat sheet welded together. The flat sheet is generally situated on the non-visible side of the motor car body, and to possess more stiffness for the assembly, it has ribs obtained by drop-stamping. Nevertheless, it is noticed that the flat sheets ribbed in all known ways are very easily distortable by twisting, which is a particularly serious disadvantage, for such twisting stresses are current in actual practice. Actually, it suffices that the forces are applied in the same direction on two opposite corners in diagonal of a flat sheet and in the same direction on the two other corners. This is often the case for all elements opening on hinges.

The present invention obviates this disadvantage, by creating a process for stiffening flat sheets, wherein a plate is formed with crossed ribs along the main torsion stress lines so that the zone of least resistance to distortion is reinforced by increasing the section and polar moment of inertia at the point where the ribs join.

The invention also applies to the application of this process to the manufacture of motor car body panel elements, which comprise a shaped steel sheet and a flat sheet whose edges are made integral by welding, this flat sheet having two crossed ribs thereon for connecting its diagonal corners, without, however, ending there, and the hollow parts of said sheet confined by the central connecting portions of the ribs being covered by a reinforcing plate fixed by means of electric spot welding.

Various other characteristics of the invention will moreover be revealed by the detailed description which follows.

One form of embodiment of the object of the invention is shown, by way of non-restrictive example, in the attached drawing.

FIGURE 1 is a plane view, showing a flat steel sheet according to the invention.

FIGURE 2 is a partial section on a larger scale taken along the line II—II of FIG. 1.

FIGURES 3 and 3a are sections on a larger scale taken along the line III—III of FIG. 1, showing two forms of embodiment.

FIGURE 4 is a partial section on a larger scale taken along the line IV—IV of FIG. 1.

FIGURES 5 and 5a are sections on a larger scale taken along the line V—V of FIG. 1, showing two forms of embodiment.

FIGURE 6 is a diagrammatical section of a motor car body element in the form of a door putting the application of the invention onto practice.

1 denotes a flat steel sheet, rectangular in the example shown, but which could have any other shape. The purpose of the invention is to stiffen this sheet, so that it may then afford sufficient resistance to distortion, when a torsion stress is more particularly applied.

On the face of the steel sheet 1 seen in the drawing, two gutters 2, 3 are hollowed out to form a projection on the opposite side of two stiffening ribs 4, 5 placed cross-wise along the main stress lines of the car body element with which said sheet is used. These lines appreciably coincide with the diagonals of the sheet, so that the ribs are located in the vicinity of the diagonals.

The gutters 2, 3 have a trapezoidal section (FIG. 3) or else a rectangular section whose angles are rounded off (FIG. 3a). They are limited at one of the ends, by a connecting rounded part 6 (FIG. 4) situated near to one of the edges 7 of the steel sheet. They extend as far as the opposite edge where they end dividing into two grooves 9 and 10 and 11 and 12 respectively, perpendicular to the edge 8. The grooves surround two areas 13, 14 for stiffening them, for these areas are intended to fix the hinges and support of the car-body element which, in the example shown, is formed by a door shown diagrammatically in FIG. 6 according to which the external curved panel is denoted by the reference numeral 28. The grooves 9 to 12 have a triangular section (FIG. 5) or else a semi-cylindrical section (FIG. 5a).

The zone of least resistance to distortion of the steel sheet 1 is, as is well known, localized at the joining point 15 of the gutters 2, 3. According to the invention, said steel sheet is reinforced level with this zone by increasing both the section and the polar moment of inertia. To this end, a circular reinforcement plate 16 is applied, then fixed by electric spot welding 17 (FIGS. 1 and 2) on to the corners 18 to 21 of the steel sheet that are slightly rounded, which border the joining point 15 with the arms of the gutters 2, 3 spreading out from the latter. Thus, the ribs 4, 5 appear projecting on the face of the sheet 1 opposite to that of the plate 16 which is integral.

It may be advantageous, more particularly for reasons of lightening, to perforate the flat steel sheet. For this purpose at least, apertures 22 to 24 are cut in the parts of this steel sheet separated by the gutters. They are surrounded by drop-stamped borders 25 to 27, with an angle profile, in the steel sheet for making the reinforcement plate 16 project. The borders 25 to 27 are parallel to the gutters 2, 3 and the apertures confined by these angles are square or rectangular.

The drawing finally shows that rounded parts are provided for connecting different portions of the sheet, so that the stresses which begin when the sheet is stressed, vary progressively.

Various modifications can moreover be applied to the form of embodiment, shown and described in detail, without going outside of the scope of the invention.

I claim:

1. A door for a motor car body, comprising an outer and an inner sheet, said sheets having their edges secured together, said inner sheet being a substantially flat sheet having at least two protruding stiffening ribs formed in said flat sheet and integral therewith, said ribs crossing one with the other and protruding from one surface only of said sheet, and a small thin flat plate rigidly connected to said inner sheet on the flat surface thereof opposite to that from which said ribs are protruding, said small plate further covering at least a portion of said sheet where said ribs cross one another whereby the flat inner sheet, the ribs and said small plate enclose a hollow reinforced portion of said flat sheet.

2. A door as set forth in claim 1, wherein a plurality of apertures are located between said stiffening ribs, said apertures being bordered by edges which project from said inner sheet.

3. A door as set forth in claim 1, wherein each said stiffening ribs is provided at one end thereof with an end portion extending longitudinally to one edge of said inner sheet having a flat area in said end portion of said ribs for mounting a hinge for said door.

4. A door as set forth in claim 2 wherein said aperture borders project from said inner sheet in a direction opposite to that of said ribs.

References Cited by the Examiner
UNITED STATES PATENTS

| | | | |
|---|---|---|---|
| 1,091,608 | 3/14 | Welch | 296—44 |
| 1,191,863 | 7/16 | Williams | 189—46 X |
| 1,230,567 | 6/17 | Comee. | |
| 1,706,649 | 3/29 | Breneman | 296—44 |
| 1,876,589 | 9/32 | Ball | 296—44 |
| 2,187,331 | 1/40 | Schulz | 296—44 |
| 2,597,786 | 5/52 | Fontaine | 189—46 |
| 2,612,651 | 10/52 | Roethel. | |

MILTON BUCHLER, *Primary Examiner.*

A. HARRY LEVY, *Examiner.*